United States Patent Office 3,325,477
Patented June 13, 1967

3,325,477
PHENYL- AND THIENYL-ACETAMIDO PENICILLINS
George Robert Fosker, Horsham, and John Herbert Charles Nayler, Dorking, England, assignors to Beecham Group Limited, Brentford, England, a British company
No Drawing. Filed July 12, 1966, Ser. No. 564,552
Claims priority, application Great Britain, July 27, 1965, 31,912/65; Feb. 24, 1966, 8,099/66
3 Claims. (Cl. 260—239.1)

This invention relates to new penicillins and is particularly concerned with a new class of penicillins which are derivatives of 6-aminopenicillanic acid and which are of value as antibacterial agents, as nutritional supplements in animal food, as agents for the treatment of mastitis in cattle and as therapeutic agents in poultry and animals, including man, in the treatment especially of infectious diseases caused by Gram-positive and Gram-negative bacteria.

According to the present invention there is provided new penicillins of the general formula:

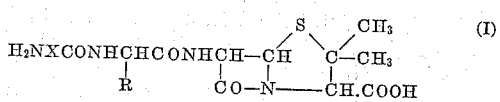

and non-toxic salts thereof, where R is an aromatic or heteroaromatic residue which may be substituted and X is a divalent aliphatic hydrocarbon radical containing from 1 to 4 carbon atoms which may bear a hydroxy substituent or be interrupted by an amide linkage.

The salts are non-toxic salts including non-toxic metallic salts such as sodium, potassium, calcium and aluminium, ammonium and substituted ammonium salts, e.g. salts of such non-toxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, and other amines which have been used to form salts with benzylpenicillin.

The new penicillins of the present invention may be prepared by way of the intermediate penicillins of the general formula:

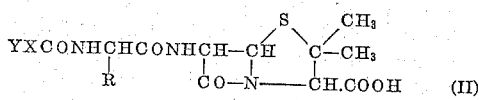

where X and R are as above defined and Y is a nitrogen-containing group which is capable of being converted into a primary amino group.

The conversion of the nitrogen-containing group Y of the intermediate penicillin (II) to a primary amino group may be effected by hydrogenation or hydrolysis, it being understood that both steps must be carried out under conditions sufficiently mild that they do not disrupt the sensitive β-lactam ring.

Examples of the nitrogen-containing group Y which, in the intermediate penicillin, can be converted into the primary amino group by a process of catalytic hydrogenation include the azido group, the benzyloxycarbonylamino group, and substituted benzyloxycarbonylamino groups.

Examples of the group Y which may be converted into a primary amino group by a process of mild acid hydrolysis include enamine groups of general Formula III, or tautomeric modifications thereof, and o-hydroxyarylideneamino groups of the general Formula IV, or tautomeric modifications thereof.

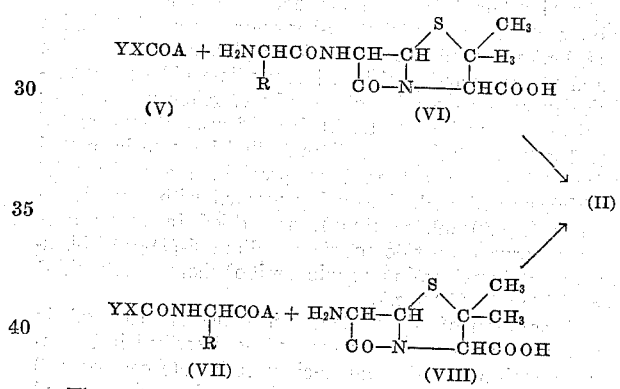

In structures (III) and (IV) the dotted lines represent hydrogen bonds. In structure (III) $R^1$ is a lower alkyl group, $R^2$ is either a hydrogen atom or together with $R^1$ completes a carbocyclic ring, and $R^3$ is a lower alkyl, aryl, or lower alkoxy group. In structure (IV) Z represents the residue of a substituted or unsubstituted benzene or naphthalene ring.

The intermediate penicillins (II) may be prepared either by treating the appropriate aminopenicillin (VI) with an acylating agent (V) or by treating 6-aminopenicillanic acid (VIII) with a dipeptide acylating agent (VII), the reactions being illustrated as follows:

$$YXCOA + H_2NCHCONHCH-CH \quad \begin{matrix} S \\ \\ \end{matrix} \quad \begin{matrix} CH_3 \\ C-CH_3 \\ \end{matrix}$$
$$\quad \quad R \quad \quad CO-N\text{———}CHCOOH$$
(V)      (VI)

→ (II)

$$YXCONHCHCOA + H_2NCH-CH \quad \begin{matrix} S \\ \\ \end{matrix} \quad \begin{matrix} CH_3 \\ C-CH_3 \\ \end{matrix}$$
$$\quad \quad R \quad \quad CO-N\text{———}CHCOOH$$
(VII)      (VIII)

The substituent A in the acylating agents (V) and (VII) may be a chlorine atom, an azido group, an acyloxy group, an alkoxycarbonyloxy group, a 1-imidazolyl group, or an NN'-disubstituted isoureido group derived from a carbodiimide.

Some of these acylating agents are unstable substances which may preferably be freshly prepared in a suitable solvent below room temperature and used in situ.

The novel penicillins of the present invention are each capable of existing in two epimeric forms and it is to be understood that the invention includes both the D- and L-forms as well as the DL-mixture.

The following examples illustrates the present invention:

*Example 1.—Sodium 6-[D-α-(glycylamino) phenylacetamido]penicillanate*

Ethyl chlorocarbonate (3.8 ml.) was added to an ice-cold solution of N-benzyloxycarbonylglycine (8.35 g.) and triethylamine (5.6 ml.) in dry acetone (50 ml.). The mixture was stirred at 0° for 10 minutes, during which triethylamine hydrochloride was precipitated and the mixed anhydride formed in solution. The suspension was cooled to −40° and stirred vigorously whilst an ice-cold solution of 6[D(-)α-aminophenylacetamido]-penicillanic acid trihydrate (16.0 g.) in a mixture of water (50 ml.), triethylamine (5.6 ml.) and acetone (10 ml.), was added as rapidly as was consistent with the temperature remaining below 0°. The resulting clear solution was stirred for 90 minutes without further cooling, and was finally extracted with ether (3×100 ml.), only the aqueous phase being retained. This aqueous solution was brought to pH 2 by the addition of 5 N hydrochloric acid (8 ml.) and quickly extracted with methyl isobutyl ketone (100 ml.). The separated solvent layer was allowed to stand, whereupon it deposited small colourless crystals of 6[D - α(benzyloxycarbonylglycylamino)phenylacetamido] penicillanic acid trihydrate (15.2 g.). (Found: C, 52.5; H, 5.5; N, 9.0; S, 5.1. $C_{26}H_{28}N_4O_7S$, $3H_2O$ requires C, 52.5; H, 5.7; N, 9.4; S, 5.4%.)

A solution of this intermediate (5.8 g.) in 3% sodium bicarbonate solution (30.5 ml.) was added to an aqueous suspension (50 ml.) of 5% palladium-calcium carbonate catalyst (11 g.) which had been previously shaken under hydrogen for 1 hour. The mixture was hydrogenated at room temperature and pressure for 1 hour and then filtered. The filtrate and washings were evaporated at low temperature and pressure, then the residual solid was dried in vacuo over phosphorus pentoxide to yield sodium 6-[D-α(glycylamino)phenylacetamido]penicillanate (4.2 g.) which was estimated by colorimetric assay with hydroxylamine to be 65% pure. When subjected to paper chromatography it revealed a single zone of antibacterial activity with an $R_F$ value lower than that of the N-protected intermediate.

*Example 2.—Sodium 6-[D-α-(β-aminopropionamido)phenylacetamido]penicillanate*

6-[D-α(β-N-benzyloxycarbonyl amino propionamido) phenylacetamido]penicillanic acid was prepared as in Example 1, except that N-benzyloxycarbonyl-β-alanine (8.9 g.) was used in place of N-benzyloxycarbonyl glycine and the protected penicillin intermediate did not crystallise from the organic solvent phase. After washing the solvent layer with saturated brine (75 ml.), it was treated with a 2 N solution of sodium-2-ethyl hexoate in methyl isobutyl ketone (20 ml.) to precipitate a white solid which was filtered, thoroughly washed with dry diethyl ether (3×50 ml. portions), and dried in vacuo over phosphorus pentoxide to yield sodium 6-[D-α(β-N-benzyloxycarbonyl amino propionamido)phenyl acetamido] penicillanate (10.8 g.).

A solution of this protected intermediate (5.0 g.) in water (30 ml.) was hydrogenated as described in Example 1 with 5% palladium-calcium carbonate catalyst (10 g.) to yield sodium 6-[D-α(β-aminopropionamido)phenyl acetamido] penicillanate (3.4 g.) which was estimated by colorimetric hydroxylamine assay to be 83% pure. When subjected to paper chromatography it revealed a single zone of antibacterial activity with a $R_F$ value lower than that of the N-protected intermediate.

*Example 3.—Sodium 6-[D-α(α amino propionamido) phenyl acetamido]penicillanate*

Sodium 6-[D-α(α-amino propionamido)phenyl acetamido]penicillanate (3.5 g., estimated by colorimetric assay to be 81% pure) was prepared exactly as described in Example 2 when N-benzyloxycarbonyl-β-alanine was replaced by N-benzyloxycarbonyl-DL-α-alanine (8.9 g.).

*Example 4.—Sodium 6-[D-α-(glycylglycylamino) phenyl acetamido]penicillanate*

Sodium 6-[D-α-(glycylglycylamino)phenyl acetamido] penicillanate (3.6 g., estimated by colorimetric assay to be 98% pure) was isolated exactly as described in Example 1 when N-benzyloxycarbonyl glycine was replaced by N-benzyloxy carbonyl glycyl glycine (10.6 g.).

*Example 5.—Sodium 6-[D-α-(L-α-amino-β-hydroxy propionamido)phenyl acetamido]penicillanate*

Sodium 6-[D-α-(L-α-amino-β hydroxy propionamido) phenyl acetamido]penicillanate (2.5 g., estimated by colorimetric assay to be 24% pure) was isolated as in Example 2 when N-benzyloxycarbonyl-β-alanine was replaced by N-benzyloxycarbonyl-L-serine (9.6 g.) except that after hydrogenation some unhydrogenated material was removed at pH 2 by solvent extraction.

*Example 6.—Sodium 6-[D-α-(L-α-amino-β-hydroxy butyramido)phenyl acetamido]penicillanate*

Sodium 6-[D-α-(L-α amino-β-hydroxy butyramido) phenyl acetamido]penicillanate (3.0 g., estimated by colorimetric assay to be 33% pure) was isolated exactly as described in Example 5 when N-benzyloxycarbonyl-L-serine was replaced by N-benzyloxycarbonyl-L-threonine (10.1 g.). The yield of the sodium N-protected intermediate was 10.8 g. and was estimated by colorimetric assay to be 89% pure.

*Example 7.—6-[D-α-(Glycylamino)phenyl acetamido]penicillanic acid*

Sodium glycinate (46.5 g.) was suspended in ethanol (125 ml.) and ethyl aceto acetate (64 ml.) and carefully heated with stirring until complete solution was effected (approximately 10 minutes). The pale yellow solution was filtered and allowed to cool, when a mass of needle shaped crystals were obtained. The mass was broken up, filtered, and washed with cold ethanol to give a crude product (100.5 g., M.P. 190–190° C.). Recrystallization from ethanol (500 ml.) yielded sodium α-N-(1 ethoxycarbonyl propen-2-yl)amino acetate (92 g., M.P. 200–201° C.). (Found, C, 45.0; H, 6.0; N, 6.8; Na, 10.7. $C_8H_{12}NNaO_4$ requires C, 45.9; H, 5.8; N, 6.7; Na, 11.0%.)

Sodium α-N(1 ethoxy carbonyl propen-2-yl) 1 amino acetate (4.0 g.) was suspended in dry acetone (40 ml.) cooled in −5° C., and treated with ethyl chloro carbonate (1.9 ml.) with 1 micro-drop of 3-dimethyl-amino propan-1-ol as catalyst. The resulting suspension was stirred at −5 to 0° C. for 20 minutes., then chilled to −30° C. An ice-cold solution of 6-[D-α amino phenyl acetamido]penicillanic acid trihydrate (7.0 g.) dissolved in water (40 ml.) and triethylamine (2.45 ml.) was added with vigorous stirring. The temperature rose to −5° C. and stirring was continued for 1¾ hours with no further external cooling.

The acetone was removed under reduced pressure, then 5 N hydrochloride acid (6 ml.) was added with vigorous shaking, whereupon the precipitated material slowly redissolved. An equal volume of diethyl ether was added and the mixture agitated for 15 minutes. The phases were separated, the ether extraction was repeated, then the aqueous phase was carefully readjusted from pH 2.0 to 6.0 with 2 N sodium hydroxide solution (7.5 ml.). The clear, almost colourless solution was evaporated to low volume under reduced temperature and pressure, whereupon crystallization occurred. The thick suspension was filtered, washed with ice-cold water (3× 5 ml.), and dried in vacuo over potassium hydroxide to yield 6-[D-α-(glycylamino)phenylacetamido]penicillanic acid trihydrate (3.5 g.). (Found: C, 46.2; H, 6.1; S, 7.0; $H_2O$ 11.9%. $C_{18}H_{22}N_4O_5S \cdot 3H_2O$ requires C, 46.9; H, 6.1; S, 7.0; $H_2O$, 11.7%.)

*Example 8.—6-[-α-(γ-aminobutyramido)phenyl acetamido]penicillanic acid*

Sodium-γ-aminobutyrate (31 g.) was suspended in ethanol (100 ml.) and ethylacetoacetate (31.7 ml.) and carefully heated with stirring until complete solution was effected (approximately 15 minutes). The solution was filtered and allowed to cool when crystallisation very slowly set in. The highly crystalline product was filtered then washed with cold ethanol to give analytically pure sodium-γ-N-(1-ethoxycarboxyl propen-2-yl)aminobutyrate (58 g., M.P. 162–164° C.).

The penicillin (9.0 g.), estimated by colorimetric assay with hydroxylamine to be 54% pure, was isolated as described in Example 7 when sodium α-N(1-ethoxycarbonyl propen-2-yl)aminoacetate was replaced by sodium γ-N (1-ethoxycarbonyl propen-2-yl)aminobutyrate (4.75 g.)

and the hydrolysate was evaporated to dryness under reduced temperature and pressure.

*Example 9*

Example 7 was repeated except that the 6(-D-α-aminophenylacetamido)penicillanic acid trihydrate was replaced by equivalent amounts of 6(-α-amino-m-hydroxylphenylacetamido)penicillanic acid,
6(-α-amino-p-hydroxylphenylacetamido)penicillanic acid,
6(-α-amino-2-thienylacetamido)penicillanic acid, or
6(-α-amino-3-thienylacetamido)penicillanic acid.

In this way the following new penicillins could be prepared:

6[-α-(glycylamino)-m-hydroxyphenylacetamido]penicillanic acid,
6[-α-(glycylamino)-p-hydroxyphenylacetamido]penicillanic acid,
6[-α-(glycylamino)-2-thienylacetamido]penicillanic acid and
6[-α-(glycylamino)-3-thienylacetamido]penicillanic acid.

We claim:
1. A compound selected from the group consisting of a penicillin of the formula:

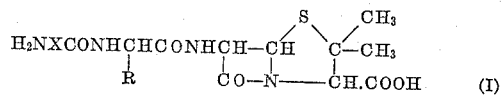

and a non-toxic salt thereof, wherein R is phenyl, hydroxyphenyl, 2-thienyl or 3-thienyl and X is a divalent aliphatic hydrocarbon radical containing from 1 to 4 carbon atoms unsubstituted or hydroxy substituted or interrupted by an amide linkage.

2. 6 - [α-(glycylamino)phenylacetamido]penicillanic acid or a non-toxic salt thereof.

3. 6-[α-(β-aminopropionamido)phenylacetamido]penicillanic acid or a non-toxic salt thereof.

No references cited.

NICHOLAS S. RIZZO, *Primary Examiner.*